United States Patent [19]

Marshall

[11] 3,722,958
[45] Mar. 27, 1973

[54] ROTATIVE WHEEL COVERS, AND THE LIKE

[76] Inventor: William H. Marshall, 1910 Missouri, Baytown, Tex. 77520

[22] Filed: Dec. 23, 1970

[21] Appl. No.: 100,904

Related U.S. Application Data

[63] Continuation-in-part of Ser. No. 41,188, May 28, 1970, abandoned.

[52] U.S. Cl. ..............................301/37 N, 301/37 SC
[51] Int. Cl. ................................................B60b 7/06
[58] Field of Search ....301/37 N, 37 SC, 37 S, 108 S, 301/108 SC

[56] References Cited

UNITED STATES PATENTS

| | | | |
|---|---|---|---|
| 2,762,469 | 9/1956 | Lyon | 301/37 SC |
| 3,219,391 | 11/1965 | Hettinger | 301/37 N |
| 3,548,185 | 12/1970 | Hall | 301/37 N |
| 2,130,220 | 9/1938 | Ball | 301/37 N |
| 2,443,760 | 6/1948 | Arrison | 301/37 SC |
| 2,707,131 | 4/1955 | Sundberg | 301/37 N |

FOREIGN PATENTS OR APPLICATIONS 279,319  11/1930  Italy..................................301/37 SC Primary Examiner—Richard J. Johnson
Attorney—Carl B. Fox, Jr.

[57] ABSTRACT

Wheel covers and the like which are mounted for rotation independently of the wheel rotation. The apparatus may be affixed to the usual hub caps of automotive vehicles, or may be affixed directly to the hub of the wheel assembly, or may be affixed to the lugs which secure the wheel to the hub assembly. Preferably, for utmost safety, the wheel covers are disposed entirely within the limits of the surrounding tire.

2 Claims, 9 Drawing Figures

Patented March 27, 1973

William H. Marshall
INVENTOR.

BY Carl B. Fox, Jr.
ATTORNEY

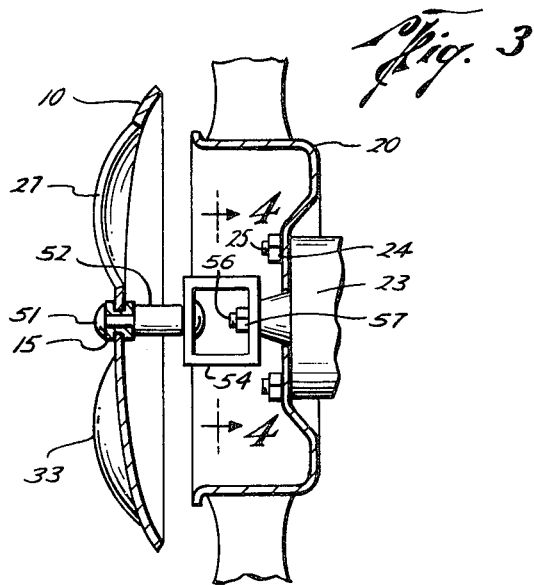
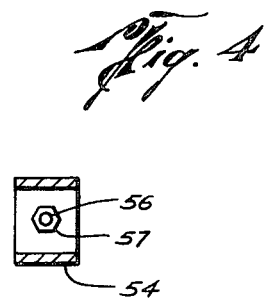
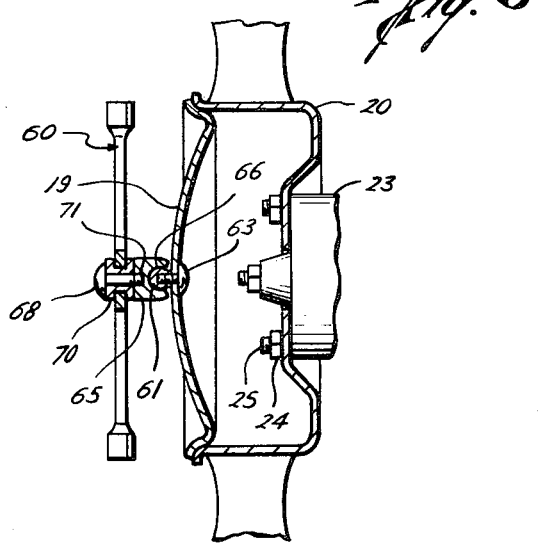
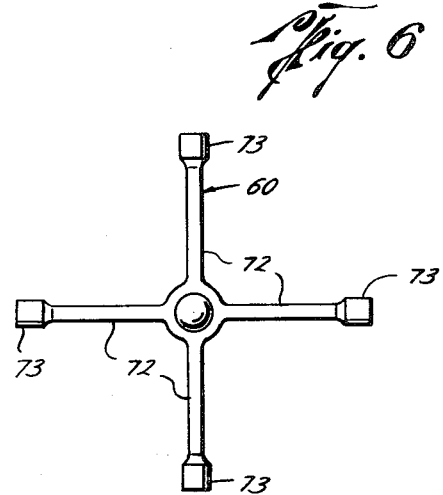
William H. Marshall
INVENTOR.

Patented March 27, 1973
3,722,958
3 Sheets-Sheet 3
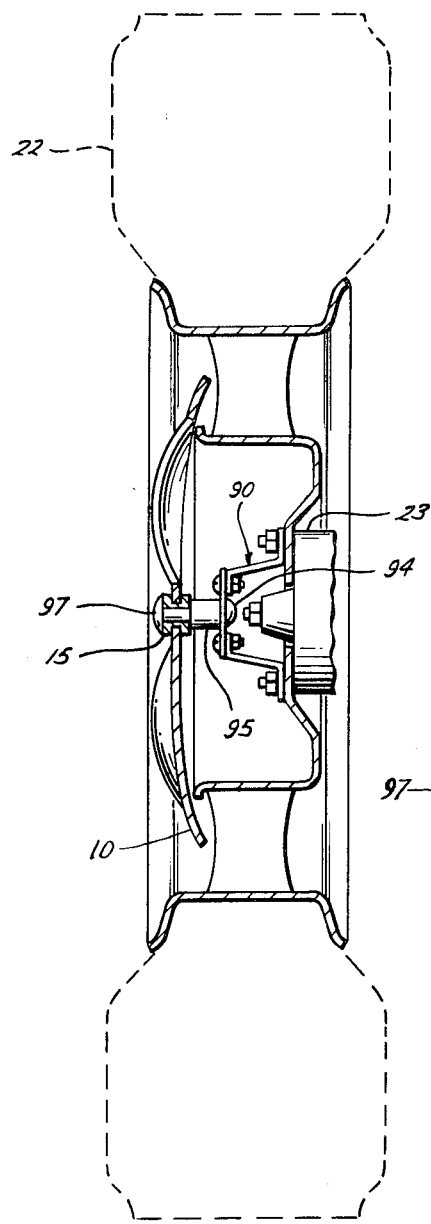
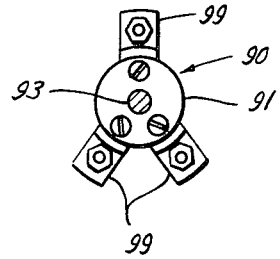
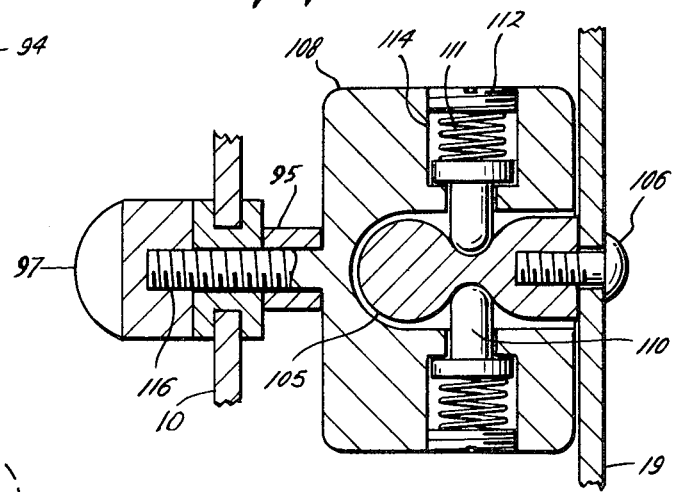
William H. Marshall
INVENTOR.
BY Carl B. Fox, Jr.
ATTORNEY

ROTATIVE WHEEL COVERS, AND THE LIKE

This application is a continuation-in-part of application Ser. No. 41,188, filed May 28, 1970 by the same applicant, entitled "Rotative Wheel Covers, and the Like", and now abandoned.

The hub caps or wheel covers of automotive vehicles are customarily affixed to the wheels so that they rotate with the wheels. While such hub caps and wheel covers may be of decorative aspect, these properties are limited since the wheel covers and hub caps rotate at the same speed as the wheels so that no abstract decorative effect is obtained. According to the invention, rotative wheel covers or other rotative devices are affixed to the conventional hub caps or wheel covers, or to the hub, of automotive vehicles, so that they rotate at speeds distinct from the speeds of rotation of the wheels, thereby giving an interesting and decorative effect. The apparatuses according to the invention are mounted for rotation upon a shaft which is connected to the usual wheel covers or hubs, or to the wheel-securing lugs, and may be louvered or otherwise formed such that air passing therepast, i.e., wind, causes rotation of the apparatuses separate and apart from wheel rotation. The devices may rotate because of wind impinging thereon both when the vehicle is moving and when the vehicle is not moving. The rotative apparatus may be decorated and colored such as to produce interesting and unusual decorative effects.

Other advantages and objects of the invention will appear from the following detailed description of the preferred embodiments thereof, reference being made to the accompanying drawings.

BRIEF DESCRIPTIONS OF THE DRAWINGS

FIG. 3 is a cross sectional view similar to FIG. 2, showing a modified form of mounting for attachment of the apparatus to the wheel of a vehicle.

FIG. 4 is a partial cross sectional view taken at line 4—4 of FIG. 3.

FIG. 5 is a cross sectional view showing another form of apparatus according to the invention.

FIG. 6 is a front elevational view of the rotative device of the apparatus shown in FIG. 5.

FIG. 7 is a cross sectional view showing a modified form of attachment of the wheel cover to the wheel.

FIG. 8 is a side elevational view of the attachment element of the apparatus of FIG. 7.

FIG. 9 is an axial cross sectional view of a detent connection between a wheel cover, according to the invention, and a hubcap.

DETAILED DESCRIPTION OF THE PREFERRED EMBODIMENTS

Figures 1, 2:
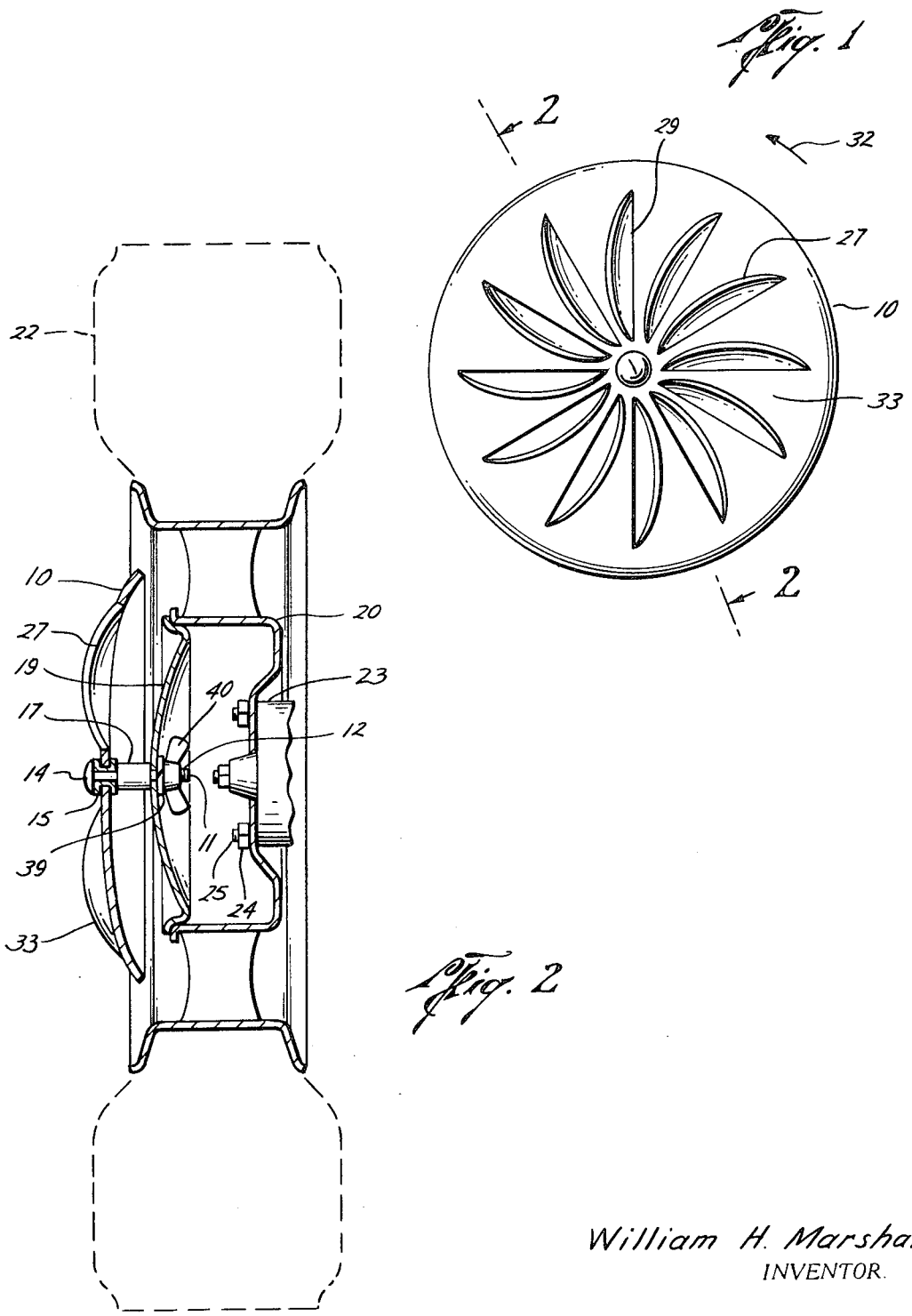
FIG. 1 is an elevational face view of a rotative wheel cover according to the invention.
FIG. 2 is a cross sectional view showing the wheel cover of FIG. 1 mounted upon the wheel of an automotive vehicle, taken at line 2—2 of FIG. 1.

Referring now to the drawings in detail, in FIG. 1 there is shown a rotative wheel cover 10 in the form of a circular disc which is convex at the side or face facing the viewer. The wheel cover 10 has a central opening through which is disposed a shaft 11 which is threaded at its end portion 12. The shaft has an enlarged head 14, like a bolt. The disc of wheel cover 10 is concentrically affixed to a bearing 15 which is retained by shaft head 14, the bearing shown being of sleeve form with shaft 11 extending therethrough. Other forms of bearings may be used. The shaft extends through a spacer sleeve 17 and then through a central opening of the hub cap 19. The hub cap 19 is mounted on the wheel 20 of a vehicle, the wheel having a tire 22 carried therearound in the customary manner.

The wheel 20 is mounted upon the hub 23 of a vehicle by lugs 24 screwed onto bolt studs 25 of the hub.

The wheel cover disc is provided with a plurality of general radially extending circularly equally spaced vanes or louvers 27. The louver formations extend outwardly from the disc, leaving openings or vents therepast, all of the louvers being directed in the same direction around the disc. Thus, the louvers are adapted to cause rotation of the wheel cover disc when wind flows past the disc. The open sides 29 of the louvers catch the air to cause counter-clockwise disc movement in the direction of arrow 32, while the opposite streamlined sides 33 of the louvers permit air to flow smoothly therepast so that counter-rotation of the disc due to a wind velocity therepast is not encountered. Some disc rotation results from rotation of the wheel of the vehicle, but disc rotation is essentially independent of wheel rotation and the disc may rotate freely when the wheel is stopped.

Mounting of the rotative wheel cover of FIGS. 1–2 is accomplished by removing the hub caps and drilling a circular hole through each hub cap at the center suited to receive shaft 11. Shaft 11 is inserted through the bearing 15 so that the bearing is retained by head 14, then spacer sleeve 17 is received over the shaft, the shaft end being inserted through the hub cap hole followed by placement of washer 39 therearound and screwing wing nut 40 tightly onto the threaded shaft end to hold the entire assembly properly together.

While the embodiment shown in FIGS. 1–2 is a circular wheel cover, it will be apparent that wheel covers according to the invention may be in shapes other than circular. For example, the discs may be of square, triangular, rectangular or oval shapes, with louvers of any suitable form being properly disposed therearound to cause rotations of the wheel covers when wind bears against the louvers of the wheel covers. It will be understood that decorative colors may be employed as desired in order that interesting and decorative appearance may be enhanced. It will further be realized that rotations of the wheel covers may occur both when the vehicle is standing still and when the vehicle is in motion. Wind alone will cause rotations of the wheel covers to produce interesting effects when a vehicle is standing at rest, and when a vehicle is in motion the wheel covers will be caused to rotate not only because of the wind effects thereon, but also because of rotative effects caused by the rotation of the wheel upon which the wheel cover is mounted. The sizes of the wheel cover discs may be as desired, and may be relatively small compared with the diameter of the wheel and tire, or may be larger than shown in the drawing in order to at least partially cover the sidewall of the tire. The principal involved is the same regardless of the size of the wheel cover disc. It should be noted that the rotative wheel covers may be removed from the wheel of a vehicle and the hub cap of the vehicle may be used alone, the only distinction thereof over the original appearance of the hub cap being that a small hole will be provided therethrough when the rotative wheel cover is not in place.

The wheel covers may be used in connection with substantially any vehicle. For example, the wheel covers may be used on each side of the front and/or rear wheels of a motorcycle or the like by variation of the mounting assembly as will be apparent to a person skilled in the art.

Referring now to FIGS. 3–5 of the drawing, there is shown the wheel cover or disc 10 mounted upon a wheel of a vehicle in a different manner than is shown in FIGS. 1–2. Elements of FIGS. 3–4 which are shown in FIGS. 1–2 are given the same reference numerals in FIGS. 3–4. The wheel cover disc 10, in FIG. 3 is rotatively secured by a rivet 51 the shank of which passes through the bearing 15 and through a spacer sleeve 52. The inner end of rivet 51 extends through a hole of fitting 54, and is deformed to form a second head on the rivet to hold the assembly together.

FItting 54 is in the form of a four-sided body, each side being flat, the four sides being interconnected serially as shown. Opposite the side of fitting 54 to which rivet 51 is connected, fitting 54 has a hole suitable for insertion of threaded axle end 56, the fitting being retained by nut 57.

In this embodiment, the fitting 54, rivet 51, and sleeve 52 will rotate with the axle, but disc 10 being mounted on bearing 15 will be free to rotate independent of axle rotation. The hub cap in this case is not used. If the disc 10 apparatus is removed, the hub cap may be installed in the original manner but without a center hole as in FIGS. 1–2.

In FIGS. 5–6 of the drawings, there is shown a device of different form, for mounting on the wheel of a vehicle to give interesting and decorative effects. The rotator 60 is shown in the shape of a lug wrench, but may take other related forms. Parts shown in FIG. 5 which appear in the earlier drawing figures are given the same reference numerals in FIG. 5.

A fitting 61, in the form of a knob or ball, is secured to hub cap 19, or wheel cover, by a bolt 63 passed through a central hole of the hub cap. Fitting 65 has an opening 66 adapted to engagingly yet removably receive fitting 61. The sidewalls around opening 66 are sufficiently resilient to permit forceable entry of the ball thereinto, and to permit forceable removal of the ball therefrom. The ball is held in opening 66 such that it will not be accidentally removed from the opening.

Bolt 68 extends through bearing 70 and is screwed into tapped opening 71 of fitting 65, which is at the opposite side of fitting 65 from opening 66. Bearing 70 is carried through an opening at the center of rotator 60.

The radial bars 72 of rotator 60 each has an enlargement 73 at its outer end, these being or corresponding to the lug socket formations of a lug wrench. The rotator may be a lug wrench or a facsimile of a lug wrench. The rotator may take other forms, e.g. the enlargements 73 may be of smooth rounded shape. The number of arms may be varied. Plural enlargements may be used. Propellor forms may be used.

The rotator of FIGS. 5–6 is not designed to be rotated by wind to the extent of the other rotators. But wind does cause rotation of this rotator. Inertial effects cause this rotator to keep spinning after the vehicle is stopped. When the rotator is snapped off of ball 61, the ball presents a pleasing and decorative effect. Other snap-on connections may be used in place of fittings 61, 65.

There is shown in FIG. 3, and not previously described, optional equipment which may be provided if desired. There is shown a locking arrangement for holding disc 10 fixed to sleeve 52, so that the disc rotates with the wheel whenever free disc rotation is not wanted. In FIG. 1, disc 10 would be fixed to sleeve 17 in the same way. Bolt 76 is placed through a hole through disc 10 and through a hole in tab 77 and secured by wing nut 78. There is also shown a spring-biased ratchet arm 81 engaged with teeth of ratchet gear ring 82 affixed concentrically to the back side of disc 10. This arrangement provides that disc 10 may rotate in only one direction, depending on the direction of rotation permitted by the ratchet.

Referring now to FIGS. 7–8 of the drawings, the wheel 20 having tire 22 mounted thereon is the same as shown in FIG. 2 of the drawings. In FIG. 7, the usual hub cap or wheel cover 19 is not used, and the rotating wheel cover 10 is mounted in a modified manner.

A spider assembly has a flat circular plate 91 having a circular central opening 93 to receive a bolt 94, the head of which is disposed at the side of plate 91 toward hub 23. The shank of bolt 94 extends outwardly, and spacer sleeve 95, which is shorter than spacer sleeve 17 of FIG. 2, and bearing 15 of the rotating wheel cover 10 are received thereover. A nut 97 is screwed onto the outer end of bolt 94 to hold these elements in place. Nut 97, as shown, is a cap nut having a curved turning flange.

Three identical legs 99, each in the form of a flat bar having an angular section between two terminal sections perforated for connection, are connected at three circularly spaced holes around plate 91. The other ends of the legs are connected beneath three of the lugs 24 around the respective studs 25. Vehicular wheels usually have five equally-circularly spaced studs and lugs, and the spider legs are connected to two adjacent studs and the spaced stud opposite therefrom. Pivoting movements of the legs with respect to plate 91 changes the radial extents of the legs, so that adjustments to connect the legs to studs on circles of different radii are provided.

An important feature of the embodiment of FIGS. 7–8 is that the rotating wheel cover 10 is disposed entirely inside of the circular sidewall of the tire 22, so that it has no projection beyond the tire. This improves the safety characteristics of the apparatus, since projections could cause injury to a person struck thereby. Thus, the apparatus in this form will meet the safety standards which are being applied more and more rigidly to automotive vehicles. In the case of hubcap-mounted rotating wheel covers, it is not always possible to design the apparatus to have all parts within the plane of the tire sidewall.

In FIG. 9, there is shown a further connection assembly which may be used in connection with any of the forms of the apparatus.

A ball fitting 105 is secured by bolt 106 to hubcap 19. Body 108 has one or more (two shown) detents 110 which are biased inwardly by springs 111. Slotted caps 112 are screwed into the detent openings 114 to permit assembly of the detents and springs. Threaded bolt formation 116 of body 108 carries spacer sleeve 95 and bearing 15, on which rotating wheel cover 10 is mounted, these being secured by nut 97. The detents are depressed for installation and removal of the wheel cover assembly. When the wheel cover assembly is removed, the ball fitting 105 is left in place, and is of smooth decorative appearance so as not to be objectionable. Using this form of the apparatus, the rotative wheel covers may be quickly and easily installed and removed when desired without use of any tool.

While preferred embodiments of the invention have been shown and described, many modifications thereof may be made by a person skilled in the art without departing from the spirit of the invention, and it is intended to protect by Letters Patent all forms of the invention falling within the scope of the following claims:

I claim:

1. Rotative wheel spinners, comprising rotative body means, shaft means for supporting said rotative body means for free rotation about said shaft means, and means for supporting said shaft means in coaxial alignment with the axle of a vehicle wheel, whereby said rotative body means may rotate concentrically with the wheel independently of wheel rotation, said means for supporting said shaft means in coaxial alignment with said axle comprising an element having plural radially extending leg means adapted for connection around wheel-mounting studs beneath the lugs screwed thereon, said element legs each being independently pivotal from radial positions with respect to said element whereby the radial extents thereof may be adjusted.

2. The combination of claim 1, said element being a circular disc means, said shaft means being inserted through an opening through the center thereof, and said leg means being pivotally mounted circularly spaced around the periphery thereof.

* * * * *